(12) United States Patent
Oda et al.

(10) Patent No.: US 11,144,595 B2
(45) Date of Patent: Oct. 12, 2021

(54) SCORE CALCULATION UNIT, SEARCH DEVICE, SCORE CALCULATION METHOD, AND SCORE CALCULATION PROGRAM

(71) Applicant: OMRON Corporation, Kyoto (JP)

(72) Inventors: Toshihiko Oda, Kusatsu (JP); Tetsuji Yamato, Yokohama (JP); Takeshi Naito, Ibaraki (JP); Sangryul Lee, Kusatsu (JP); Shuichi Misumi, Kyoto (JP); Ryota Yamada, Tokyo (JP)

(73) Assignee: OMRON Corporation, Kyoto (JP)

( * ) Notice: Subject to any disclaimer, the term of this patent is extended or adjusted under 35 U.S.C. 154(b) by 27 days.

(21) Appl. No.: 16/609,230

(22) PCT Filed: May 29, 2018

(86) PCT No.: PCT/JP2018/020468
§ 371 (c)(1),
(2) Date: Oct. 29, 2019

(87) PCT Pub. No.: WO2018/225576
PCT Pub. Date: Dec. 13, 2018

(65) Prior Publication Data
US 2020/0050635 A1    Feb. 13, 2020

(30) Foreign Application Priority Data

Jun. 6, 2017 (JP) .............................. JP2017-111319

(51) Int. Cl.
*G06F 16/9032* (2019.01)
*G06F 16/901* (2019.01)
(Continued)

(52) U.S. Cl.
CPC .. *G06F 16/90328* (2019.01); *G06F 16/24578* (2019.01); *G06F 16/901* (2019.01); *G06F 16/9035* (2019.01)

(58) Field of Classification Search
CPC ............ G06F 16/90328; G06F 16/901; G06F 16/9035; G06F 16/24578
(Continued)

(56) References Cited

U.S. PATENT DOCUMENTS 7,814,085 B1\* 10/2010 Pfleger ................... G06F 16/951
707/708
2014/0372561 A1\* 12/2014 Hisano ................. G08G 1/0112
709/217
(Continued)

FOREIGN PATENT DOCUMENTS

JP    H05-108726 A    4/1993
JP    2003-173280 A    6/2003
(Continued)

OTHER PUBLICATIONS

Mendes, Pablo N., et al., "DBpedia Spotlight: Shedding Light on the Web of Documents", I-Semantics 2011, Graz, Austria, Sep. 7-9, 2011, pp. 1-8.\*
(Continued)

*Primary Examiner* — Robert Stevens
(74) *Attorney, Agent, or Firm* — Metrolex IP Law Group, PLLC

(57) ABSTRACT

First and second data catalogs each indicate sensing data attributes. The first and second data catalogs each include a first word indicating an observation object of a sensor that generated sensing data and a second word indicating an
(Continued)

observation characteristic of the sensor. A score calculation unit includes a first weight determination part, a second weight determination part, and a score calculation part. The first weight determination part determines a first weight value relating to the observation object, based on the relationship between the first words included in the first and second data catalogs. The second weight determination part determines a second weight value relating to the observation characteristic, based on the relationship between the second words included in the first and second data catalogs. The score calculation part calculates a score relating to the coincidence of the first and second data catalogs, using the first and second weight values.

15 Claims, 12 Drawing Sheets

(51) Int. Cl.
  *G06F 16/9035* (2019.01)
  *G06F 16/2457* (2019.01)
(58) Field of Classification Search
  USPC .......................................................... 707/723
  See application file for complete search history.

(56) References Cited

U.S. PATENT DOCUMENTS

| 2015/0006548 A1* | 1/2015 | Huang .................... G06F 16/23 707/749 |
| 2015/0006573 A1* | 1/2015 | Fusume ................ G06F 16/334 707/771 |
| 2016/0210862 A1 | 7/2016 | Hisano |

FOREIGN PATENT DOCUMENTS

| JP | 2013-162258 A | 8/2013 |
| JP | 2013-205994 A | 10/2013 |
| JP | 5445722 B1 | 3/2014 |
| WO | 2014/041826 A1 | 3/2014 |

OTHER PUBLICATIONS

Gollapalli, Mohammed, "Literature Review of Attribute Level and Structure Level Data Linkage Techniques", IJDKP, vol. 5, No. 5, Sep. 2015, pp. 1-20.*
The International Search Report of PCT/JP2018/020468 dated Sep. 4, 2018, 5 pages.
The Written Opinion of PCT/JP2018/020468 dated Sep. 4, 2018, 6 pages.
An extended European search report dated Oct. 12, 2020 in a counterpart European patent application, 11 pages.

* cited by examiner

FIG. 2

| Attribute Name | | | | |
|---|---|---|---|---|
| Sensing Data Provider | | | | |
| | Organization | | | |
| | | Organization Name | | |
| | | Organization Name (in katakana) | | |
| | | Contact Address | | |
| Sensing Data Provision Period | | | | |
| | Period | | | |
| | | Start | | |
| | | End | | |
| Sensing Data Measurement Location | | | | |
| | Type | | | |
| | Measurement Location | | | |
| Sensing Data Object | | | | |
| | Sensing Data Name | | | |
| | Sensing Data Description | | | |
| | Sensing Data Utilization Field | | | |
| | | Field Name | | |
| | Observation Object | | | |
| | | Observation Object Name | | |
| | | Observation Object Description | | |
| | | Observation Characteristic | | |
| | | | Observation Characteristic Name | |
| | | | Observation Characteristic Description | |
| | | | Observation Characteristic Unit | |
| | | | Observation Characteristic Measurement Date-Time Type | |
| Event Data Specification | | | | |
| | Event Data | | | |
| | | Event Data ID | | |
| | | Event Data Description | | |
| Data Sales Contract Conditions | | | | |
| | Use Application | | | |
| | Provision Range | | | |
| | Trading Conditions | | | |
| | Personal Information | | | |
| | Anonymously Processed Information | | | |
| | Data Validity Period Restrictions | | | |
| | | Start | | |
| | | End | | |
| | Payment Type | | | |

| Attribute Name | | | | |
|---|---|---|---|---|
| Sensing Data User | | | | |
| | Organization | | | |
| | | Organization Name | | |
| | | Organization Name (in katakana) | | |
| | | Contact Address | | |
| Sensing Data Use Period | | | | |
| | Period | | | |
| | | Start | | |
| | | End | | |
| Sensing Data Measurement Location | | | | |
| | Type | | | |
| | Measurement Location | | | |
| Sensing Data Object | | | | |
| | Sensing Data Name | | | |
| | Sensing Data Description | | | |
| | Sensing Data Utilization Field | | | |
| | | Field Name | | |
| | Observation Object | | | |
| | | Observation Object Name | | |
| | | Observation Object Description | | |
| | | Observation Characteristic | | |
| | | | Observation Characteristic Name | |
| | | | Observation Characteristic Description | |
| | | | Observation Characteristic Unit | |
| | | | Observation Characteristic Measurement Date-Time Type | |
| Event Data Specification | | | | |
| | Event Data | | | |
| | | Event Data ID | | |
| | | Event Data Description | | |
| Data Sales Contract Conditions | | | | |
| | Use Application | | | |
| | Provision Range | | | |
| | Trading Conditions | | | |
| | Personal Information | | | |
| | Anonymously Processed Information | | | |
| | Data Validity Period Restrictions | | | |
| | | Start | | |
| | | End | | |
| | Payment Type | | | |

FIG. 6

(A)
Observation Object (Home Environment)

| | Degree of Association of Vocabulary | Inter-vocabulary Distance |
|---|---|---|
| Home Environment | perfect match | 1.0 |

(B)
Observation Characteristic (Air Temperature)

| | Degree of Association of Vocabulary | Inter-vocabulary Distance |
|---|---|---|
| Temperature | perfect match with synonym | 0.8 |
| Humidity | no match | 0 |

FIG. 7

(A)
Observation Object (Adult Male)

|  | Degree of Association of Vocabulary | Inter-vocabulary Distance |
|---|---|---|
| Adult | perfect match with hypernym | 0.5 |

(B)
Observation Characteristic (Blood Pressure)

|  | Degree of Association of Vocabulary | Inter-vocabulary Distance |
|---|---|---|
| Maximum Blood Pressure | partial match | 0.1 |
| Minimum Blood Pressure | partial match | 0.1 |
| Pulse | no match | 0 |

(C)
Observation Characteristic (Heart Rate)

|  | Degree of Association of Vocabulary | Inter-vocabulary Distance |
|---|---|---|
| Maximum Blood Pressure | no match | 0 |
| Minimum Blood Pressure | no match | 0 |
| Pulse | perfect match with synonym | 0.8 |

FIG. 8

(A)
Observation Object (Home Environment)

| | Degree of Association of Vocabulary | Inter-vocabulary Distance |
|---|---|---|
| Home Environment | perfect match | 1.0 |
| Adult | no match | 0 |

(B)
Observation Object (Adult Male)

| | Degree of Association of Vocabulary | Inter-vocabulary Distance |
|---|---|---|
| Home Environment | no match | 0 |
| Adult | perfect match with hypernym | 0.5 |

(C)
Observation Characteristic (Air Temperature)

| | Degree of Association of Vocabulary | Inter-vocabulary Distance |
|---|---|---|
| Temperature | perfect match with synonym | 0.8 |
| Humidity | no match | 0 |
| Maximum Blood Pressure | no match | 0 |
| Minimum Blood Pressure | no match | 0 |
| Pulse | no match | 0 |

(D)
Observation Characteristic (Blood Pressure)

| | Degree of Association of Vocabulary | Inter-vocabulary Distance |
|---|---|---|
| Temperature | no match | 0 |
| Humidity | no match | 0 |
| Maximum Blood Pressure | partial match | 0.1 |
| Minimum Blood Pressure | partial match | 0.1 |
| Pulse | no match | 0 |

(E)
Observation Characteristic (Heart Rate)

| | Degree of Association of Vocabulary | Inter-vocabulary Distance |
|---|---|---|
| Temperature | no match | 0 |
| Humidity | no match | 0 |
| Maximum Blood Pressure | no match | 0 |
| Minimum Blood Pressure | no match | 0 |
| Pulse | perfect match with synonym | 0.8 |

FIG. 12

SCORE CALCULATION UNIT, SEARCH DEVICE, SCORE CALCULATION METHOD, AND SCORE CALCULATION PROGRAM

TECHNICAL FIELD

This invention relates to a score calculation unit, a search device, a score calculation method, and a score calculation program.

BACKGROUND ART

Conventionally, sensor network systems in which sensing data sensed by a sensor is distributed between a provider side and a user side have been examined (e.g., refer to Patent Literature 1). The provider side registers a sensor and sensor-side metadata relating to sensing data that is sensed and provided by this sensor in a network server. Also, the user side registers an application that uses sensing data and application-side metadata relating to the sensing data that is used by this application in the network server. Sensor-side metadata is information relating to the sensor and attributes of the sensing data that are obtained by this sensor. Application-side metadata is information relating to the application itself and attributes of the sensing data that are required by this application.

The network server performs matching for judging the coincidence of sensor-side metadata and application-side metadata, and extracts a sensor capable of providing sensing data that satisfies the requirements of the application. The network server transmits a dataflow control instruction to a sensor management apparatus that manages the extracted sensor. This dataflow control instruction is for instructing that the sensing data is distributed from the data provider to the data user.

Also, the network server performs matching of sensor-side metadata and application-side metadata, by judging the coincidence with regard to an observation object, which is information relating to an attribute of the sensing data, and observation characteristics of the observation object. The observation object referred to here is an abstraction of a phenomenon in the real world (person, object, event, etc.), examples of which include home environment, adult, car, and weather. Also, the observation characteristics are characteristics of the observation object that are observed by a sensor. Observation characteristics in the case where the observation object is home environment, for example, are temperature, humidity, and the like. Also, observation characteristics in the case where the observation object is adult, for example, are maximum blood pressure, minimum blood pressure, and the like. Also, the observation characteristics in the case where the observation object is car, for example, are position, speed, and the like. Also, observation characteristics in the case where the observation characteristic is weather, for example, are air temperature, rainfall, and the like.

CITATION LIST

Patent Literature

Patent Literature 1: JP 5445722

SUMMARY OF INVENTION

Technical Problem

In the Patent Literature 1, words (terms) indicating the observation object and observation characteristics that the sensor-side metadata and the application-side metadata each include will most likely have been arbitrarily selected by the persons who create the respective metadata. That is, when expressing the observation object and observation characteristics of the same contents, different words will most likely be selected on the provider side and the user side. In such cases, there is a possibility of not being able to appropriately judge the coincidence of sensor-side metadata and application-side metadata, depending on the either-or determination as to the coincidence or non-coincidence of the words indicating the observation object and observation characteristics.

In order to provide sensing data desired by the user side to the user side, the coincidence of sensor-side metadata and application-side metadata must be appropriately judged. In other words, unless the coincidence of sensor-side metadata and application-side metadata is appropriately judged, the sensing data desired by the user side cannot be provided to the user side.

Also, matching of sensor-side metadata and application-side metadata is processing that involves searching for a provider side that can provide sensing data that satisfies the requirements of the user side. Thus, the above matching is not only executed in the case of distributing sensing data with the dataflow control instruction described in Patent Literature 1, and can be executed in various cases such as when confirming whether the user side is able to receive provision of sensing data that the user side wants to use.

An object of this invention is to provide a technology capable of appropriately judging the coincidence of two data catalogs.

Solution to Problem

A score calculation unit according to an aspect of this invention is configured to calculate a score relating to a coincidence of a first data catalog and a second data catalog. The first and second data catalogs each include a first word indicating an observation object and a second word indicating an observation characteristic. The score calculation unit is provided with a first weight determination part, a second weight determination part, and a score calculation part. The first weight determination part is configured to determine, based on a relationship between the first word included in the first data catalog and the first word included in the second data catalog, a first weight value relating to the observation object. Also, the second weight determination part is configured to determine, based on a relationship between the second word included in the first data catalog and the second word included in the second data catalog, a second weight value relating to the observation characteristic. The score calculation part is configured to calculate, using the first and second weight values, a score relating to a coincidence of the first data catalog and the second data catalog.

In this score calculation unit, a score relating to the coincidence of the first data catalog and the second data catalog is calculated, by using first and second weight values. That is, in this score calculation unit, even if the observation object and observation characteristics are expressed with different words in the respective catalogs, a high score is calculated in the case where the association between these words is strong. Accordingly, with this score calculation unit, the coincidence of the first data catalog and the second data catalog can be appropriately judged.

Also, the first weight determination part may be configured to determine the first weight value, based on a degree of association of a meaning of the first words, for example.

The second weight determination part may be configured to determine the second weight value, based on a degree of association of a meaning of the second words, for example. Synonyms, hypernyms and the like may be used as a basis for judging the degree of association of the meaning of the words.

In this way, rather than judging the coincidence of the first data catalog with the second data catalog by the coincidence/non-coincidence of the words indicating the observation object and observation characteristics, the coincidence of the first data catalog with the second data catalog is judged, based on the degree of association of the meaning of the words indicating the observation object and observation characteristics, thus enabling the coincidence of the first data catalog and the second data catalog to be appropriately judged.

Also, the first data catalog may, for example, be a sensor-side data catalog relating to a sensor that senses the observation characteristic of the observation object, in which case the second data catalog may be an application-side data catalog relating to an application that uses sensing data sensed by the sensor.

Note that the first data catalog may be the application-side data catalog, and the second data catalog may be the sensor-side data catalog.

Also, a search device according to another aspect of this invention is provided with the above score calculation unit and a first data catalog storage part configured to store the first data catalog, the score calculation unit being configured to calculate a score for the first data catalog stored in the first data catalog storage part with respect to the second data catalog.

With this configuration, the coincidence of the first data catalog that is stored in the first data catalog storage part with the second data catalog can be judged.

Also, the score calculation unit may further include a filtering processing part configured to perform filtering processing for narrowing down the first data catalogs stored in the first data catalog storage part to a first data catalog whose score is to be calculated with respect to the second data catalog. Such a configuration enables the processing load related to score calculation to be suppressed.

Furthermore, this search device may be provided with an output part configured to output the score of the first data catalog with respect to the second data catalog, calculated by the score calculation unit. Such a configuration enables the coincidence of the first data catalog with the second data catalog to be quantitatively recognized by an operator.

Also, a score calculation method according to another aspect of this invention is a method executed by a computer in order to calculate a score relating to a coincidence of a first data catalog and a second data catalog. The first and second data catalogs each include a first word indicating an observation object and a second word indicating an observation characteristic. The score calculation method includes a step of determining, based on a relationship between the first word included in the first data catalog and the first word included in the second data catalog, a first weight value relating to the observation object, a step of determining, based on a relationship between the second word included in the first data catalog and the second word included in the second data catalog, a second weight value relating to the observation characteristic, and a step of calculating, using the first and second weight values, a score relating to a coincidence of the first data catalog and the second data catalog.

In this score calculation method, a score relating to the coincidence of the first data catalog and the second data catalog is calculated, by using first and second weight values. That is, in this score calculation method, even if the observation object and observation characteristics are expressed with different words in the respective catalogs, a high score is calculated in the case where the association between these words is strong. Accordingly, with this score calculation method, the coincidence of the first data catalog and the second data catalog can be appropriately judged.

Also, a score calculation program according to another aspect of this invention causes a computer to execute processing for calculating a score relating to a coincidence of a first data catalog and a second data catalog. The first and second data catalogs each include a first word indicating an observation object and a second word indicating an observation characteristic. The score calculation program is configured to cause the computer to execute a step of determining, based on a relationship between the first word included in the first data catalog and the first word included in the second data catalog, a first weight value relating to the observation object, a step of determining, based on a relationship between the second word included in the first data catalog and the second word included in the second data catalog, a second weight value relating to the observation characteristic, and a step of calculating, using the first and second weight values, a score relating to a coincidence of the first data catalog and the second data catalog.

In this score calculation program, a score relating to the coincidence of the first data catalog and the second data catalog is calculated, by using first and second weight values. That is, in this score calculation method, even if the observation object and observation characteristics are expressed with different words in the respective catalogs, a high score is calculated in the case where the association between these words is strong. Accordingly, with this score calculation method, the coincidence of the first data catalog and the second data catalog can be appropriately judged.

Advantageous Effects of Invention

According to this invention, a technology capable of appropriately judging the coincidence of two data catalogs can be provided.

BRIEF DESCRIPTION OF DRAWINGS

FIG. 2 is a diagram showing the contents of a provider data catalog.

FIG. 3 is a diagram showing the contents of a user data catalog.

FIGS. 6(A) and (B) are diagrams illustrating inter-word distances of the provider data catalog and the user data catalog shown in FIG. 5(A).

FIGS. 7(A) to (C) are diagrams illustrating inter-word distances of the provider data catalog and the user data catalog shown in FIG. 5(B).

FIGS. 8(A) to (E) are diagrams illustrating inter-word distances of the provider data catalog and the user data catalog shown in FIG. 5(C).

FIG. 12 is a diagram showing an example display screen of processing result of ranking processing.

DESCRIPTION OF EMBODIMENTS

Hereinafter, embodiments of this invention will be described.

Figure 1:
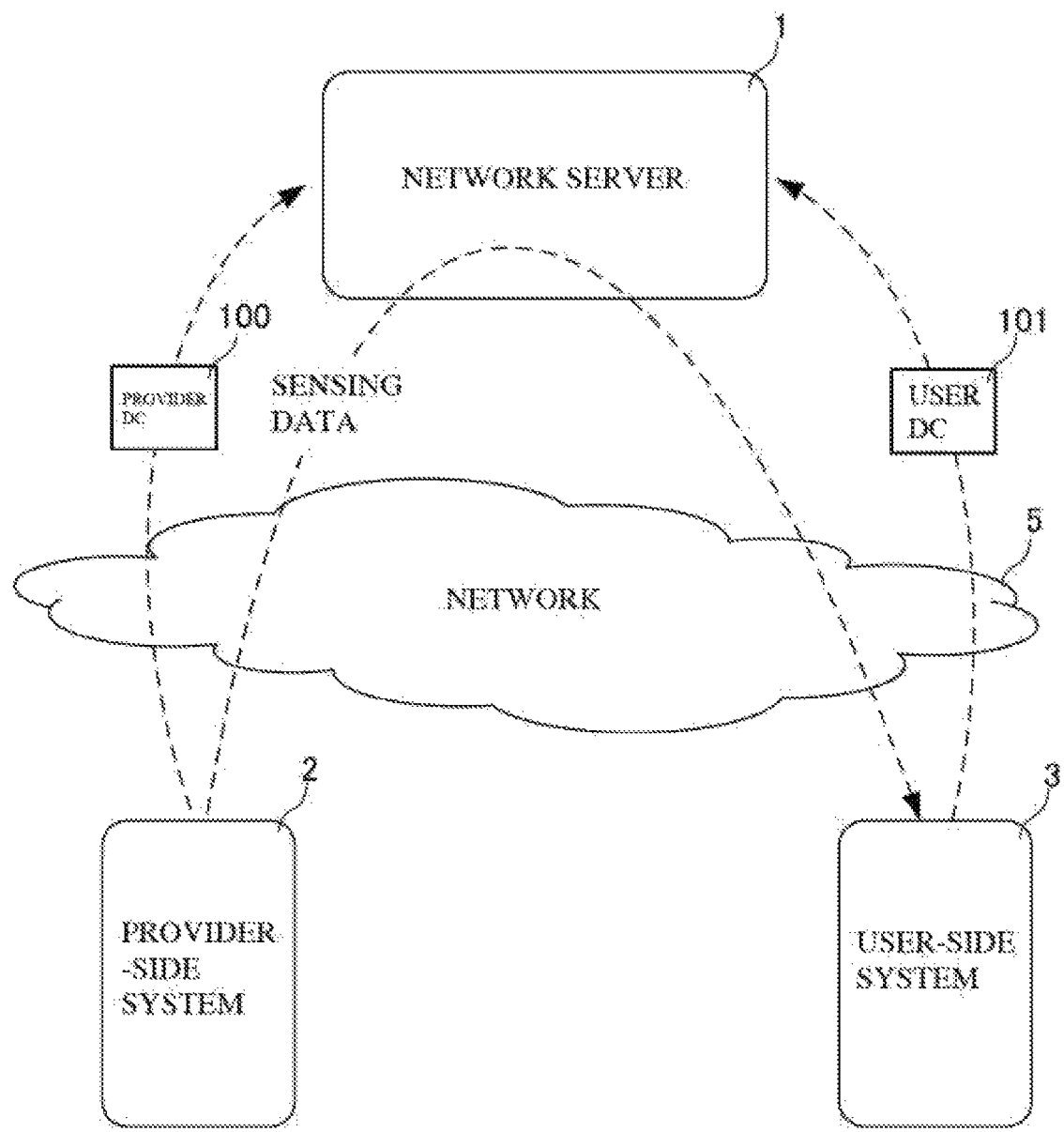
FIG. 1 is a schematic view showing a sensing data distribution system.

First, a sensing data distribution system that distributes sensing data between a provider and a user and achieves utilization of sensing data will be briefly described. FIG. 1 is a schematic view showing the sensing data distribution system. In this sensing data distribution system, a network server 1, a provider-side system 2 and a user-side system 3 are communicably connected via a network 5. A plurality of provider-side systems 2 are connected to the network server 1 via the network 5 (in FIG. 1, only one provider-side system 2 is illustrated). Similarly, a plurality of user-side systems 3 are connected to the network server 1 via the network 5 (in FIG. 1, only one user-side system 3 is illustrated). This sensing data distribution system is a system for distributing sensing data that is traded between the provider-side system 2 and the user-side system 3.

The network server 1 realizes a sensing data distribution market, that is, a Sensing Data Trading Market (SDTM), which is a marketplace on the Internet for trading sensing data. The provider-side system 2 provides sensing data obtained by sensing observation characteristics of an observation object with a sensor (not illustrated). The user-side system 3 uses sensing data that is provided by the provider-side system 2.

The observation object referred to here is an abstraction of a phenomenon in the real world (person, object, event, etc.), examples of which include home environment, adult, car, and weather. Also, the observation characteristics are characteristics of the observation object that are observed with a sensor. For example, the observation characteristics in the case where the observation object is home environment are temperature, humidity, and the like. Also, the observation characteristics in the case where the observation object is adult are maximum blood pressure, minimum blood pressure, pulse, and the like. Also, the observation characteristics in the case where the observation object is car are position, speed, and the like. Also, the observation characteristics in the case where the observation characteristic is weather are temperature, rainfall, and the like.

The provider-side system 2 registers a provider data catalog 100 (provider DC 100) relating to sensing data that is traded on the SDTM in the network server 1. The provider data catalog 100 describes attribute information of the sensing data to be provided. The user-side system 3 registers a user data catalog 101 (user DC 101) relating to sensing data that is traded on the SDTM in the network server 1. The user data catalog 101 describes attribute information of the sensing data to be used.

Here, the provider data catalog 100 and the user data catalog 101 will be described. FIG. 2 is a diagram showing the contents of the provider data catalog, and FIG. 3 is a diagram showing the contents of the user data catalog. As shown in FIG. 2, the provider data catalog 100, when broadly divided, includes items such as sensing data provider, sensing data provision period, sensing data measurement location, sensing data object, event data specification, and data sales contract conditions.

Sensing data provider is an item relating to the organization (individual or business operator) that provides the sensing data. Attribute information of the sensing data provider includes the name of the organization (Organization Name), the name of the organization in katakana notation (Organization Name (in katakana)), and the contact address of the organization (Contact Address).

Sensing data provision period is an item relating to the period for which the sensing data will be provided. The attribute information of the sensing data provision period includes the date on which provision of sensing data will start (Start), and the date on which provision of sensing data will end (End).

Sensing data measurement location is an item relating to the location where the measurement object is sensed. The attribute information of the sensing data measurement location includes type of measurement location and measurement location. Type of measurement location indicates either fixed whereby the measurement location remains unchanged every measurement or moving whereby the measurement location changes every measurement. A measurement location is entered in the case of the fixed type.

Sensing data object is an item relating to the sensing data. The attribute information of the sensing data object includes the name of the sensing data (Sensing Data Name), a brief description of the sensing data (Sensing Data Description), the field in which the sensing data will be utilized (Field Name), and the observation object. Here, observation object is an observation object of the sensor that generated the sensing data. Also, an observation object is entered for every observation object, and is information indicating the name of the observation object, a description of the observation object, observation characteristics, and the like. Here, observation characteristic is an observation characteristic of the sensor that generated the sensing data. Also, observation characteristic is information indicating the name of the observation characteristic, a description of the observation characteristic, the unit of the observation characteristic, a measurement date-time type of the observation characteristic (intermittent or continuous), and the like.

Event data specification is an item relating to event conditions. The attribute information of the event data specification is information indicating the label name of the event condition (Event Data ID), the data representation and meaning of the value of the event data (Event Data Description), and the like.

Data sales contract conditions is an item relating to trading of the sensing data. The attribute information of the data sales contract conditions includes use application, provision range, trading conditions, personal information, anonymously processed information, data validity period restrictions, and payment type. Use application indicates the use application (commercial/noncommercial/unrestricted) of the sensing data. Provision range shows the third party provision permissibility of the sensing data. Trading conditions shows data replication impermissible/data replication permissible/data modification permissible/data manipulable, and the like. Personal information indicates whether personal information is included in the sensing data. Anonymously processed information indicates whether anonymously processed information is included in the sensing data. Data validity period restrictions shows the start date and the end date of the validity period of the sensing data. Payment total shows the payment method of costs incurred in using the sensing data.

Also, as shown in FIG. 3, the user data catalog 101, when broadly divided, includes items such as sensing data user, sensing data use period, sensing data measurement location, sensing data object, event data specification, and data sales contract conditions. The user data catalog 101 is also in a similar format to the abovementioned provider data catalog 100. The items in the user data catalog 101, namely, sensing data measurement location, sensing data object, event data specification and data sales contract conditions, are similar to the abovementioned provider data catalog 100.

Sensing data user is an item relating to the organization (individual or business operator) that uses the sensing data. Attribute information of the sensing data user includes the name of the organization (Organization Name), the name of the organization in katakana notation (Organization Name (in katakana)), and the contact address of the organization (Contact Address). Also, sensing data use period is an item relating to the period for which the sensing data will be used. The attribute information of the sensing data use period includes the date on which use of sensing data will start (Start), and the date on which use of sensing data will end (End).

The network server 1 performs matching processing for extracting a provider-side system 2 to provide sensing data to the user-side system 3, based on the coincidence of the provider data catalog 100 and the user data catalog 101, and distributes the sensing data between the provider-side system 2 and the user-side system 3.

Note that the sensing data may be provided from the provider-side system 2 to the user-side system 3 via the network server 1, as shown in FIG. 1, or may be provided from the provider-side system 2 to the user-side system 3 without passing via the network server 1.

Figure 4:
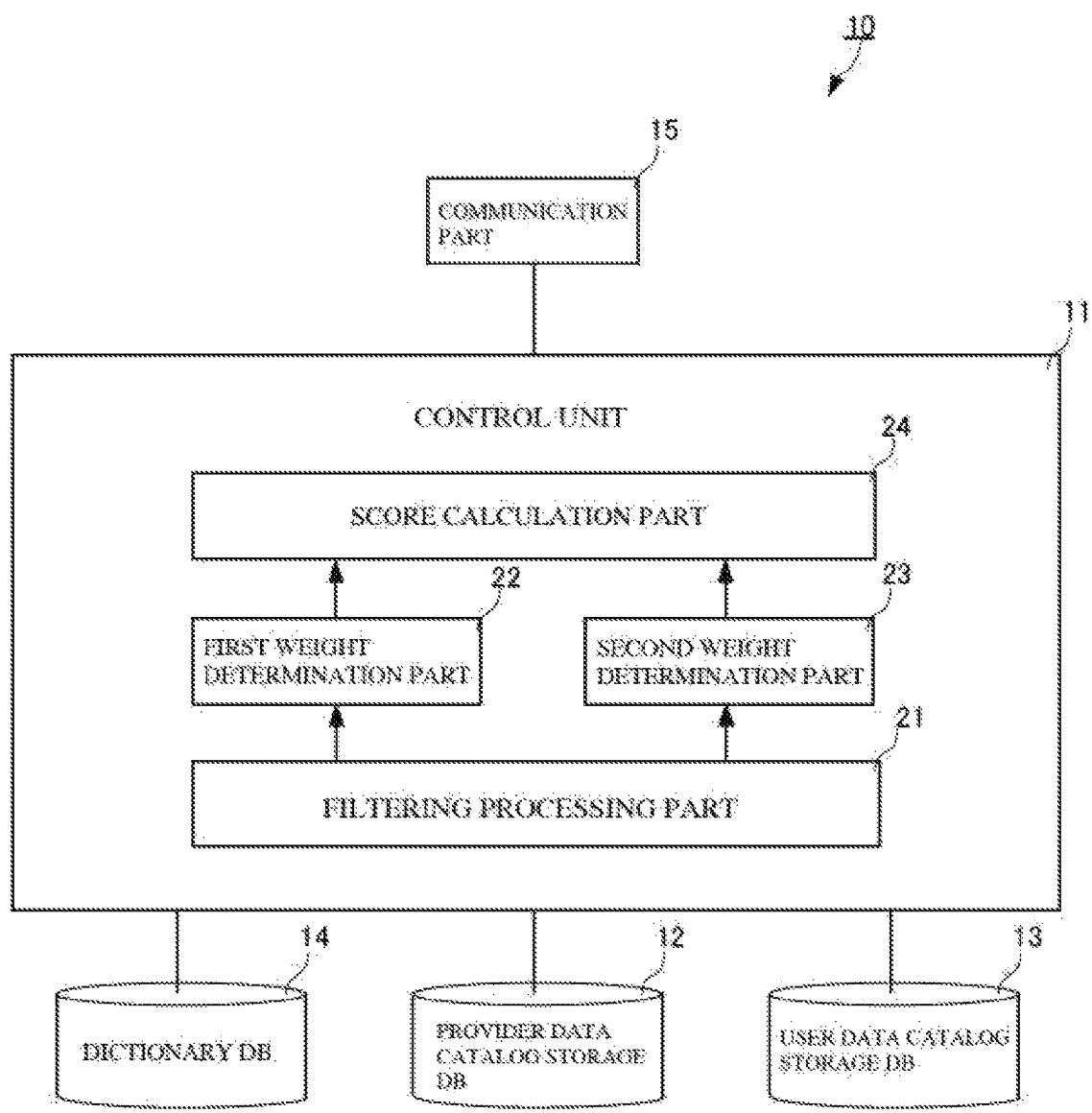
FIG. 4 is a block diagram showing the configuration of a main section of a search device.
Figure 5:
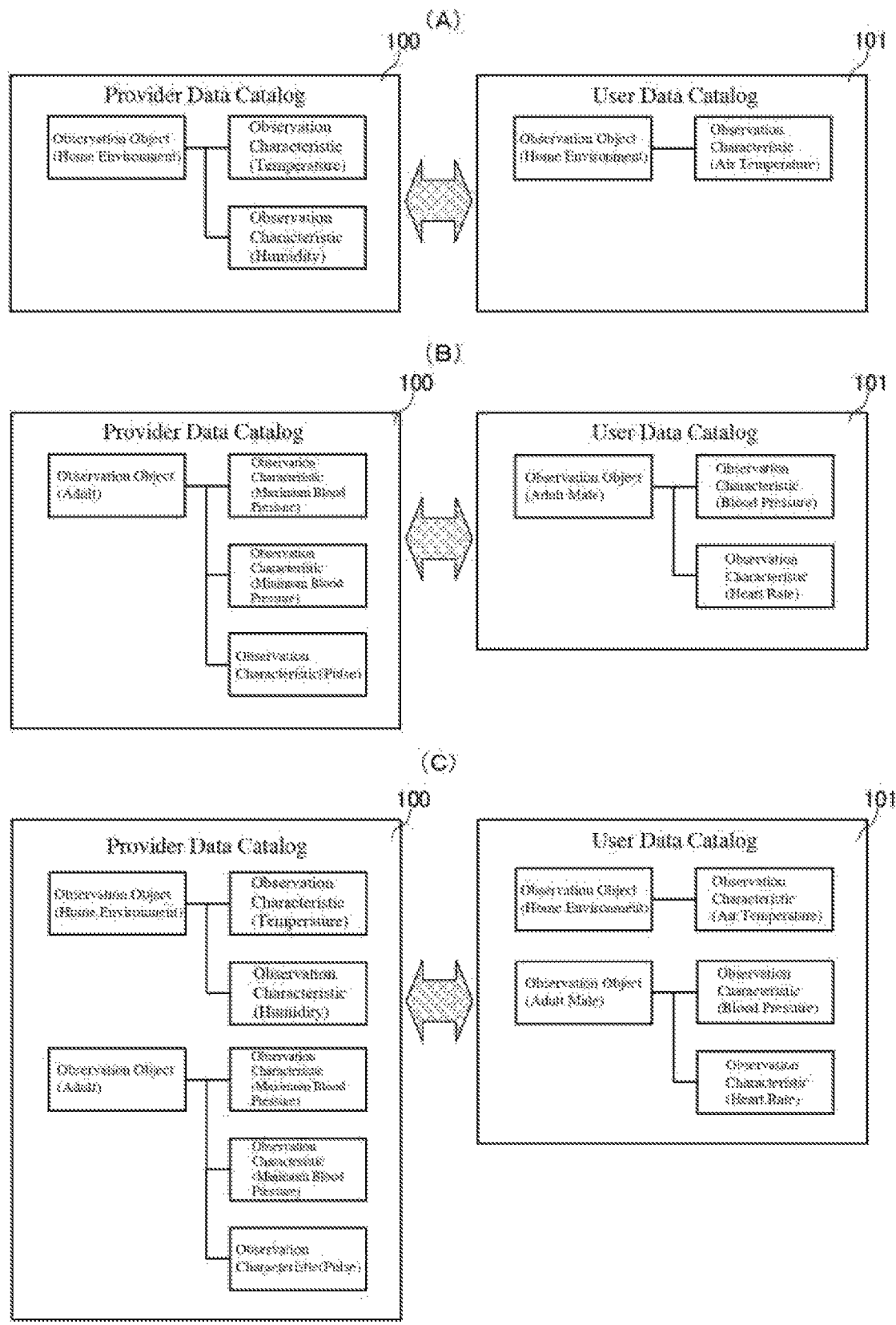
FIGS. 5(A), (B) and (C) are diagrams showing provider data catalogs and user data catalogs that are used in score calculation.

Next, the search device according to an embodiment of this invention will be described. FIG. 4 is a diagram showing the configuration of a main section of the search device. The search device 10 performs matching processing for judging the coincidence of the provider data catalog 100 and the user data catalog 101. This search device 10 calculates a score that serves as a measure indicating the coincidence of the provider data catalog 100 and the user data catalog 101, and judges the coincidence of the provider data catalog 100 and the user data catalog 101, based on the calculated score. As mentioned above, attribute information of sensing data that is provided by the provider-side system 2 is registered in the provider data catalog 100. Also, attribute information of sensing data that is used by the user-side system 3 is registered in the user data catalog 101.

This search device 10 may, for example, be used by the user-side to search the sensing data that is traded on the SDTM for sensing data that the user-side wants to use. In this case, this search device 10 may be constituted integrally with the network server 1 shown in FIG. 1, or may be constituted separately from the network server 1. Also, this search device 10 may be applied to the network server 1, and used by this network server 1 to extract a provider-side system 2 to provide sensing data to the user-side system 3 (the search device 10 may be used to execute the abovementioned matching processing).

Names (words) indicating observation objects and names (words) indicating observation characteristics in the provider data catalog 100 shown in FIG. 2 are words (terms, vocabulary) arbitrarily chosen by the provider side (creator of this provider data catalog 100). Also, names (words) indicating observation objects and names (words) indicating observation characteristics in the user data catalog 101 shown in FIG. 3 are words (terms, vocabulary) arbitrarily chosen by the user side (creator of this user data catalog 101). That is, different words will likely be selected by the provider side and the user side, when expressing the same contents (observation objects, observation characteristics). Thus, the coincidence of sensing data in a provider data catalog 100 and a user data catalog 101 cannot be appropriately judged, simply by judging whether names indicating observation objects and names indicating observation characteristics in the provider data catalog 100 match/do not match names indicating observation objects and names indicating observation characteristics in the user data catalog 101.

The search device 10 in this example is provided with a control unit 11, a provider data catalog storage database 12 (provider data catalog storage DB 12), a user data catalog storage database 13 (user data catalog storage DB 13), a dictionary database 14 (dictionary DB 14), and a communication part 15.

The control unit 11 controls the operations of the respective parts of the main body of the search device 10. Also, the control unit 11 has a filtering processing part 21, a first weight determination part 22, a second weight determination part 23, and a score calculation part 24. The filtering processing part 21, the first weight determination part 22, the second weight determination part 23 and the score calculation part 24 will be described later in detail. This control unit 11 is an example of the score calculation unit according to the present invention.

The provider data catalog storage DB 12 stores provider data catalogs 100 registered in the network server 1 by the provider-side systems 2. Also, the user data catalog storage DB 13 stores user data catalogs 101 registered in the network server 1 by the user-side systems 3. The provider data catalog storage DB 12 and the user data catalog storage DB 13 may be shared by the search device 10 and the network server 1, or may be for exclusive use by the search device 10.

The dictionary DB 14 is a database in which words are recorded in association with hypernyms, synonyms and the like of the words. That is, the dictionary DB 14 is a database in which a thesaurus that classifies/arrays words by meaning is registered.

The communication part 15 performs data communication with other devices (provider-side systems 2, user-side systems 3, etc.) via the network 5.

Next, the filtering processing part 21, the first weight determination part 22, the second weight determination part 23 and the score calculation part 24 included in the control unit 11 will be described.

The filtering processing part 21 performs filtering processing for extracting provider data catalogs 100 that do not correspond to any of the conditions (1) to (4) shown below from the provider data catalog storage DB 12. The search device 10 calculates, for every provider data catalog 100 extracted by the filtering processing part 21, a score with respect to the user data catalog 101 to be processed. The user data catalog 101 to be processed may be a user data catalog 101 that is stored in the user data catalog storage DB 13, or may be a user data catalog 101 received from the user-side system 3 or the like via the communication part 15. That is, the user data catalog 101 to be processed may be stored in the user data catalog storage DB 13, or may not be stored in the user data catalog storage DB 13.

(1) Provider data catalog 100 whose sensing data provision period does not cover the sensing data use period of the user data catalog 101 to be processed.

(2) Provider data catalog 100 whose sensing data measurement location differs from the sensing data measurement location of the user data catalog 101 to be processed.

(3) Provider data catalog 100 whose sensing data utilization field differs from the sensing data utilization field of the user data catalog 101 to be processed.

(4) Provider data catalog 100 whose sensing data sales contract conditions do not agree with the sensing data sales contract conditions of the user data catalog 101 to be processed.

Note that the filtering processing part 21 need only be configured to perform filtering processing with at least one or more conditions (not limited to the above conditions (1)-(4)).

The first weight determination part 22 determines, for every observation object described in the user data catalog 101 to be processed, a weight value α for the provider data catalog 100 whose score is to be calculated. In this example, the first weight determination part 22 derives, for every observation object described in the user data catalog 101 to be processed, an inter-word distance d with each observation object described in the provider data catalog 100 whose score is to be calculated. The first weight determination part 22 determines, for every observation object described in the user data catalog 101 to be processed, the sum of the inter-word distances d derived for that observation object as the weight value α of that observation object.

Also, the second weight determination part 23 determines, for every observation characteristic of the observation objects described in the user data catalog 101 to be processed, a weight value β with respect to the provider data catalog 100 whose score is to be calculated. In this example, the second weight determination part 23 derives, for every observation characteristic described in the user data catalog 101 to be processed, an inter-word distance d with each observation characteristic described in the provider data catalog 100 whose score is to be calculated. The second weight determination part 23 determines, for every observation characteristic described in the user data catalog 101 to be processed, the sum of the inter-word distances d derived for that observation characteristic as the weight value β of that observation characteristic.

In this example, the first weight determination part 22 and the second weight determination part 23 derive the inter-word distance d with the same technique. This inter-word distance d is a value indicating the degree of association of the meaning of words (terms). In this example, the inter-word distance d is derived by the determination of (A) to (E) shown below.

(A) When the word described in the user data catalog 101 perfectly matches the word described in the provider data catalog 100, the inter-word distance d is set to d1 (in this example, d1=1).

(B) When the word described in the user data catalog 101 partially matches rather than perfectly matches the word described in the provider data catalog 100, the inter-word distance d is set to d2 (in this example, d2=0.1).

(C) When a synonym of the word described in the user data catalog 101 perfectly matches the word described in the provider data catalog 100, the inter-word distance d is set to d3 (in this example, d3=0.8). Note that in the case where a synonym of the word described in the provider data catalog 100 perfectly matches the word described in the user data catalog 101, the inter-word distance d may also be set to d3.

(D) When the word described in the user data catalog 101 perfectly matches a hypernym of the word described in the provider data catalog 100, the inter-word distance d is set to d4 (in this example, d4=0.5). Note that in the case where the word described in the provider data catalog 100 perfectly matches a hypernym of the word described in the user data catalog 101, the inter-word distance d may also be set to d4.

(E) In the case of not corresponding to any of the above (A) to (D), the inter-word distance d is set to d5 (in this example, d5=0).

Note that in the case of corresponding to the above (C) or (D) as well as corresponding to the above (B), (C) or (D) is prioritized. That is, in the case of corresponding to both (B) and (C), for example, (C) is prioritized, and the inter-word distance d is set to d3 (d3=0.8). Also, in the case of corresponding to both (B) and (D), (D) is prioritized, and the inter-word distance d is set to d4 (d4=0.5).

Also, in the above (A) to (E), words described in the user data catalog 101 describe an observation object or an observation characteristic of an observation object, and words described in the provider data catalog 100 similarly describe an observation object or an observation characteristic of an observation object.

For example, in the case where the word indicating an observation object described in the provider data catalog 100 is "maximum blood pressure":

(A) if the word indicating an observation object described in the user data catalog 101 is "maximum blood pressure", the inter-word distance d is set to d1;

(B) if the word indicating an observation object described in the user data catalog 101 is "high blood pressure", the inter-word distance d is set to d2;

(C) if the word indicating an observation object described in the user data catalog 101 is "diastolic blood pressure", the inter-word distance d is set to d3;

(D) if the word indicating an observation object described in the user data catalog 101 is "blood pressure", the inter-word distance d is set to d4; and (E) if the word indicating an observation object described in the user data catalog 101 is "diastolic phase", "diastolic blood pressure value" or the like, the inter-word distance d is set to d5.

Note that in the above (D) (perfect match with hypernym), "blood pressure" also corresponds to a partial match with "maximum blood pressure". As mentioned above, in the present embodiment, (D) is prioritized in the case of corresponding to both (B) (partial match) and (D). Accordingly, in the case where the word indicating an observation object described in the user data catalog 101 is "blood pressure", (D) is prioritized and the inter-word distance d will be d4. Also, the technique for deriving the inter-word distance d shown in (A) to (E) is one example, and the inter-word distance d may be derived with other techniques. Also, the technique with which the first weight determination part 22 derives the inter-word distance d and the technique with which the second weight determination part 23 derives the inter-word distance d may be different techniques. Furthermore, the abovementioned technique for determining the weight value α of an observation object and the weight value β of an observation characteristic of the observation object is also one example, and the weight value α of an observation object and the weight value β of an observation characteristic of the observation object may be determined with other techniques.

The score calculation part 24 calculates the score of the provider data catalog 100 with respect to the user data catalog 101 to be processed, using the weight value α determined for every observation object and the weight value β determined for every observation characteristic of the observation objects. In this example, the score calculation part 24 calculates, for every observation object described in the user data catalog 101, the product of the weight value α of that observation object and the sum of the weight values β of the observation characteristics of that observation object, and, furthermore, calculates the sum of the products calculated here as the score of the provider data catalog 100 with respect to the user data catalog 101 to be processed.

Note that this technique for calculating the score of a provider data catalog 100 with respect to the user data catalog 101 to be processed is also one example, and the score may be calculated with other techniques.

The calculation of the score of a provider data catalog 100 with respect to the user data catalog 101 to be processed by the search device 10 in this example will be specifically described, with reference to FIGS. 5 to 8. FIGS. 5(A), (B) and (C) are diagrams showing combinations of user data catalogs and provider data catalogs whose score is to be calculated. In the provider data catalog 100 shown in FIG. 5(A), there is one observation object, namely, home environment, and there are two observation characteristics of this home environment, namely, temperature and humidity. Also, in the user data catalog 101 shown in FIG. 5(A), there is one observation object, namely, home environment, and there is one observation characteristic of this home environment, namely, air temperature.

There is one combination of words of the observation objects for deriving the inter-word distance d, namely, home environment of the provider data catalog 100 and home environment of the user data catalog 101. Because the combination of words of the observation objects for deriving the inter-word distance d corresponds to (A), the derived inter-word distance d is 1.0 (refer to FIG. 6(A)).

Also, there are two combinations of observation characteristics of the observation objects for deriving the inter-word distance d, namely, the combination of temperature of the provider data catalog 100 and air temperature of the user data catalog 101, and the combination of humidity of the provider data catalog 100 and air temperature of the user data catalog 101. Because the combination of air temperature and temperature corresponds to the abovementioned (C), the derived inter-word distance d is 0.8, and because the combination of temperature and humidity corresponds to the abovementioned (E), the derived inter-word distance d is 0 (refer to FIG. 6(B)).

The first weight determination part 22 thereby determines the weight value α of home environment serving as an observation object to be 1.0. The second weight determination part 23 determines the weight value β of air temperature serving as an observation characteristic to be 0.8 (inter-word distance of air temperature and temperature+inter-word distance of air temperature and humidity). The score calculation part 24 calculates the score of the provider data catalog 100 with respect to the user data catalog 101 to be:

Score=(weight value α of home environment)× (weight value β of air temperature)=1.0×0.8=0.8

Also, in the provider data catalog 100 shown in FIG. 5(B), there is one observation object, namely, adult, and there are three observation characteristics of this adult, namely, maximum blood pressure, minimum blood pressure, and pulse. Also, in the user data catalog 101 shown in FIG. 5(B), there is one observation object, namely, adult male, and there are two observation characteristics of this adult male, namely, blood pressure and heart rate.

There is one combination of words of the observation objects for deriving the inter-word distance d, namely, adult of the provider data catalog 100 and adult male of the user data catalog 101. Because this combination of words of the observation objects corresponds to the abovementioned (D), the derived inter-word distance d is 0.5 (refer to FIG. 7(A)).

Also, there is a total of six combinations of observation characteristics of the observation objects for deriving the inter-word distance d, namely, the three combinations of maximum blood pressure, minimum blood pressure and pulse of the provider data catalog 100 with blood pressure of the user data catalog 101, and the three combination of maximum blood pressure, minimum blood pressure and pulse of the provider data catalog 100 with heart rate of the user data catalog 101. Because the combination of blood pressure and maximum blood pressure corresponds to the abovementioned (B), the derived inter-word distance d is 0.1, because the combination of blood pressure and minimum blood pressure corresponds to the abovementioned (B), the derived inter-word distance d is 0.1, and because the combination of blood pressure and pulse corresponds to the abovementioned (E), the derived inter-word distance d is 0 (refer to FIG. 7(B)). Also, because the combination of heart rate and maximum blood pressure corresponds to the abovementioned (E), the derived inter-word distance d is 0, because the combination of heart rate and minimum blood pressure corresponds to the abovementioned (E), the derived inter-word distance d is 0, and because the combination of heart rate and pulse corresponds to the abovementioned (C), the derived inter-word distance d is 0.8 (refer to FIG. 7(C)).

The first weight determination part 22 thereby determines the weight value α of adult male serving as the observation object to be 0.5. The second weight determination part 23 determines the weight value β of blood pressure serving as an observation characteristic to be 0.2 (inter-word distance of blood pressure and maximum blood pressure+inter-word distance of blood pressure and minimum blood pressure+inter-word distance of blood pressure and pulse). Also, the second weight determination part 23 determines the weight value β of heart rate serving as an observation characteristic to be 0.8 (inter-word distance of heart rate and maximum blood pressure+inter-word distance of heart rate and minimum blood pressure+inter-word distance of heart rate and pulse).

The score calculation part 24 calculates the score of the provider data catalog 100 with respect to the user data catalog 101 to be:

Score=(weight value α of adult male)×(weight value β of blood pressure+weight value β of heart rate)=0.5×(0.2+0.8)=0.5.

Also, in the provider data catalog 100 shown in FIG. 5(C), there are two observation objects, namely, home environment and adult. There are two observation characteristics of home environment, namely, temperature and humidity, and three observation characteristics of adult, namely, maximum blood pressure, minimum blood pressure, and pulse. Also, there are two observation objects of the user data catalog 101 shown in FIG. 5(C), namely, home environment and adult male. There is one observation characteristic of home environment, namely, air temperature, and two observation characteristics of adult male, namely, blood pressure and heart rate.

There is a total of four combinations of words of the observation objects for deriving the inter-word distance d, namely, the two combinations of home environment and adult of the provider data catalog 100 with home environment of the user data catalog 101, and the two combinations of home environment and adult of the provider data catalog 100 with adult male of the user data catalog 101. Because the combination of home environment and home environment serving as observation objects corresponds to the abovementioned (A), the derived inter-word distance d is 1.0, and because the combination of home environment and adult corresponds to the abovementioned (E), the derived inter-word distance d is 0 (refer to FIG. 8(A)). Also, because the combination of adult male and home environment serving as observation objects corresponds to the abovementioned (E), the derived inter-word distance d is 0, and because the combination of adult male and adult corresponds to the abovementioned (D), the derived inter-word distance d is 0.5 (refer to FIG. 8(B)).

Also, there is a total of 15 combinations of observation characteristics of the observation objects for deriving the inter-word distance d, namely, the five combinations of temperature, humidity, maximum blood pressure, minimum blood pressure and pulse of the provider data catalog 100 with air temperature of the user data catalog 101, the five combinations of temperature, humidity, maximum blood pressure, minimum blood pressure and pulse of the provider data catalog 100 with blood pressure of the user data catalog 101, and the five combinations of temperature, humidity, maximum blood pressure, minimum blood pressure and pulse of the provider data catalog 100 with heart rate of the user data catalog 101.

Because the combination of air temperature and temperature serving as observation characteristics corresponds to the above (C), the derived inter-word distance d is 0.8, and because the four combinations of humidity, maximum blood pressure, minimum blood pressure and pulse with temperature all correspond to the abovementioned (E), the derived inter-word distance d is 0 (refer to FIG. 8(C)). Also, because the two combinations of maximum blood pressure and minimum blood pressure serving as observation characteristics with blood pressure correspond to the abovementioned (D), the derived inter-word distance d is 0.5, and because the three combinations of temperature, humidity and pulse with blood pressure correspond to the abovementioned (E), the derived inter-word distance d is 0 (refer to FIG. 8(D)). Furthermore, because the combination of heart rate and pulse serving as observation characteristics corresponds to the abovementioned (C), the derived inter-word distance d is 0.8, and because the four combination of temperature, humidity, maximum blood pressure and minimum blood pressure with heart rate all correspond to the abovementioned (E), the derived inter-word distance d is 0 (refer to FIG. 8(E)).

The first weight determination part 22 thereby determines the weight value $\alpha$ of home environment serving as an observation object to be 1.0 (inter-word distance of home environment and home environment+inter-word distance of home environment and adult), and determines the weight value $\alpha$ of adult male serving as an observation object to be 0.5 (inter-word distance of adult male and home environment+inter-word distance adult male and adult). Also, the second weight determination part 23 determines the weight value $\beta$ of air temperature serving as an observation characteristic to be 0.8 (inter-word distance of air temperature and temperature+inter-word distance of air temperature and humidity+inter-word distance of air temperature and maximum blood pressure+inter-word distance of air temperature and minimum blood pressure+inter-word distance of air temperature and pulse). Also, the second weight determination part 23 determines the weight value $\beta$ of blood pressure serving as an observation characteristic to be 1.0 (inter-word distance of blood pressure and temperature+inter-word distance of blood pressure and humidity+inter-word distance of blood pressure and maximum blood pressure+inter-word distance of blood pressure and minimum blood pressure+inter-word distance of blood pressure temperature and pulse). Furthermore, the second weight determination part 23 determines the weight value $\beta$ of heart rate serving as an observation characteristic to be 0.8 (inter-word distance of heart rate and temperature+inter-word distance of heart rate and humidity+inter-word distance of heart rate and maximum blood pressure+inter-word distance of heart rate and minimum blood pressure+inter-word distance of heart rate and pulse).

The score calculation part 24 calculates the score of the provider data catalog 100 with respect to the user data catalog 101 to be:

Score=(weight value $\alpha$ of home environment)× (weight value $\beta$ of temperature)+(weight value $\alpha$ of adult male)×(weight value $\beta$ of blood pressure+weight value $\beta$ of heart rate)=(1.0×0.8)+ (0.5×(1.0+0.8))=1.7

The control unit 11 of this search device 10 is constituted by a hardware CPU, a memory, and other electronic circuitry. The hardware CPU functions as the abovementioned filtering processing part 21, first weight determination part 22, second weight determination part 23, and score calculation part 24. Also, the memory has an area for decompressing the score calculation program according to this invention, and an area for temporarily storing data produced when this score calculation program is executed and the like. The control unit 11 may be an LSI that integrates a hardware CPU, a memory, and the like.

Figure 9:
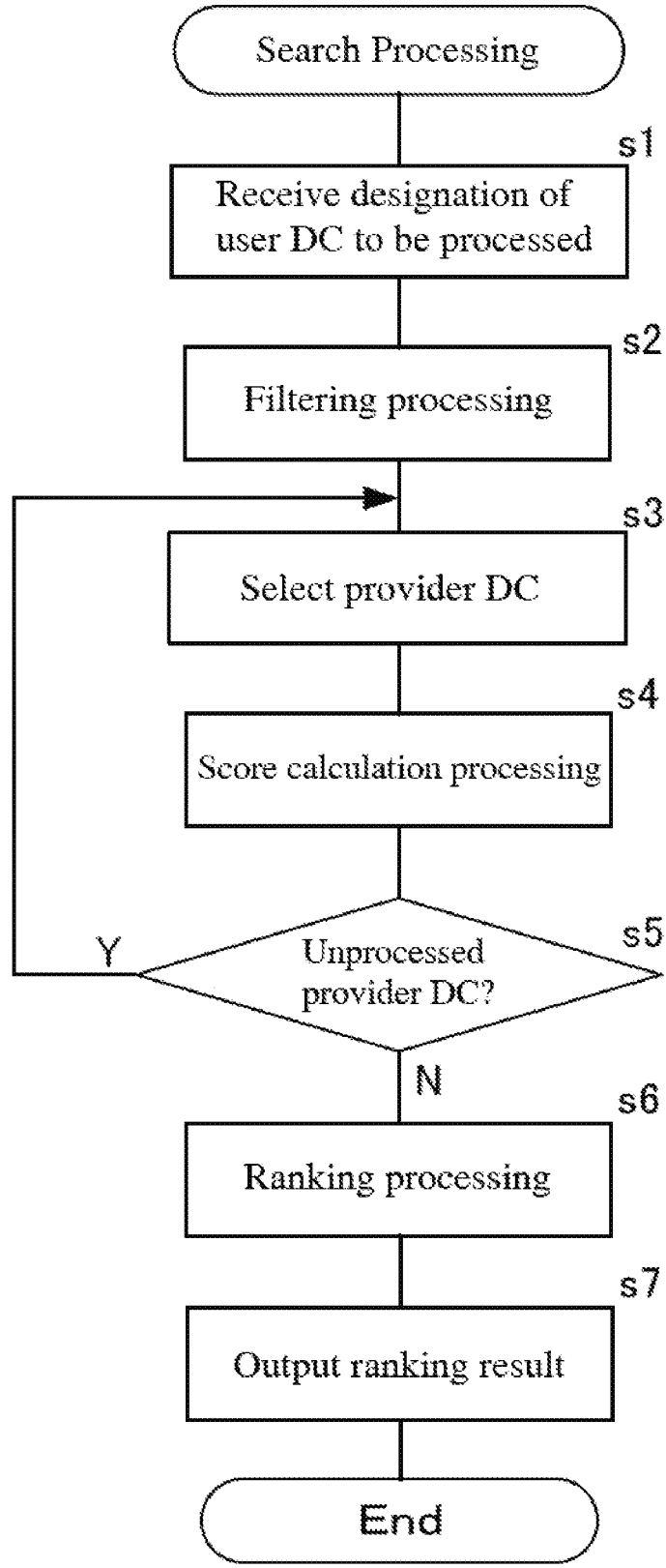
FIG. 9 is a flowchart showing operations of the search device.

Next, operations of this search device 10 will be described, with reference to FIG. 9. FIG. 9 is a flowchart showing processing for searching for a data catalog performed by the search device.

The search device 10 receives designation of a user data catalog 101 to be processed (s1). The user data catalog 101 to be processed, as mentioned above, may be a user data catalog 101 stored in the user data catalog storage DB 13, or may be a user data catalog 101 received from the user-side system 3 or the like via the communication part 15.

The search device 10 performs, with the filtering processing part 21, filtering processing for extracting provider data catalogs 100 whose score is to be calculated with respect to the user data catalog 101 to be processed (s2). The search device 10, by executing filtering processing according to s2, suppresses the total number of provider data catalogs 100 whose score is to be calculated with respect to the user data catalog 101 to be processed. Specifically, the filtering processing part 21 does not extract provider data catalogs 100 corresponding to any of the abovementioned conditions (1) to (4) as provider data catalogs 100 whose score is to be calculated with respect to the user data catalog 101 to be processed. In other words, the filtering processing part 21 extracts provider data catalogs 100 that do not correspond to any of the conditions of abovementioned (1) to (4), as provider data catalogs 100 whose score is to be calculated with respect to the user data catalog 101 to be processed.

The search device 10 reduces the processing load related to score calculation, by performing this filtering processing according to s2.

The search device 10 selects a provider data catalog 100 whose score is to be calculated with respect to the user data catalog 101 to be processed from among the provider data catalogs 100 extracted in s2 (s3). The search device 10 performs score calculation processing for calculating a score for the provider data catalog 100 selected in s3 with respect to the user data catalog 101 to be processed (s4).

Figure 10:
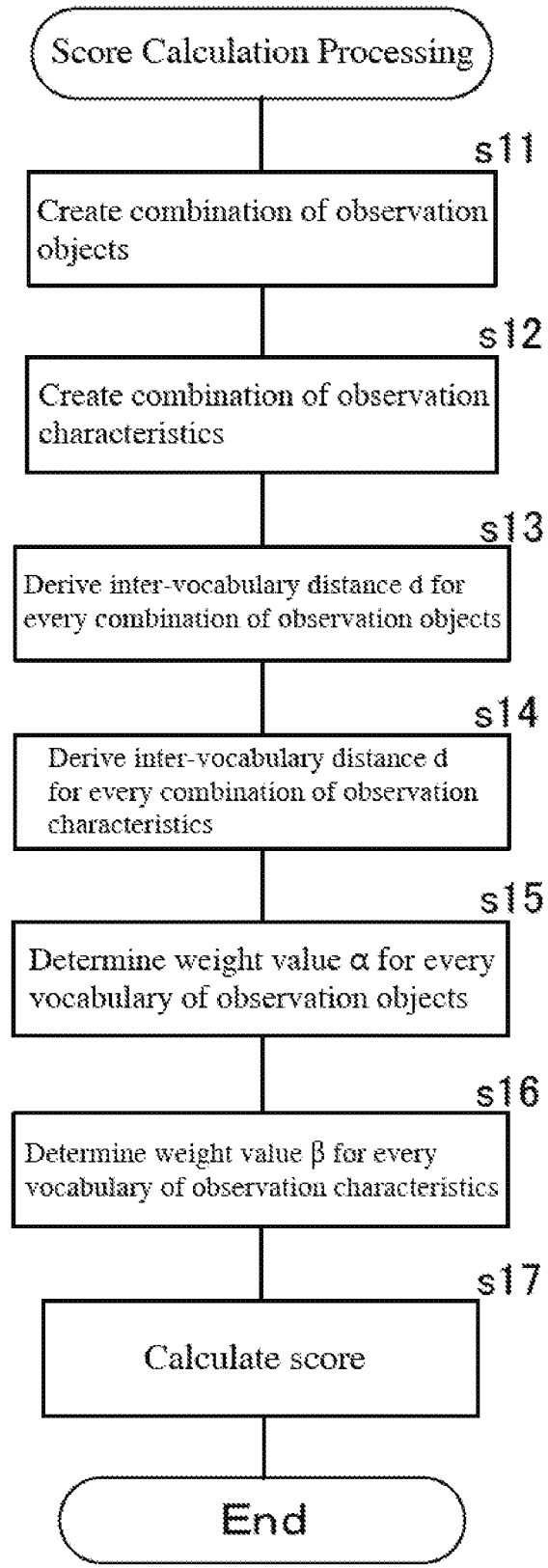
FIG. 10 is a flowchart showing score calculation processing.

The score calculation processing according to s4 will be described. FIG. 10 is a flowchart showing the score calculation processing. The first weight determination part 22 creates combinations of observation objects described in the user data catalog 101 to be processed and observation objects described in the provider data catalog 100 selected in s3 (s11). In s11, the number of combinations of observation objects that are created is n×m combinations, where n is the number of observation objects described in the user data catalog 101 to be processed, and m is the number of observation objects described in the provider data catalog 100 selected in s3.

Also, the second weight determination part 23 creates combinations of observation characteristics described in the user data catalog 101 to be processed and observation characteristics described in the provider data catalog 100 selected in s3 (s12). In s12, the number of combinations that are created is n×m combinations, where n is the number of observation characteristics of the observation objects described in the user data catalog 101 to be processed and m is the number of observation characteristics of the observation objects described in the user data catalog 101 selected in s3.

The first weight determination part 22 derives the inter-word distance d for every combination of observation objects created in s11 (s13). Also, the second weight determination part 23 derives the inter-word distance d for every combination of the observation characteristics of the observation objects created in s12 (s14). The processing for deriving the inter-word distance d in s13 and s14 is the same (only the words of the objects for deriving the inter-word distance d differ).

Figure 11:
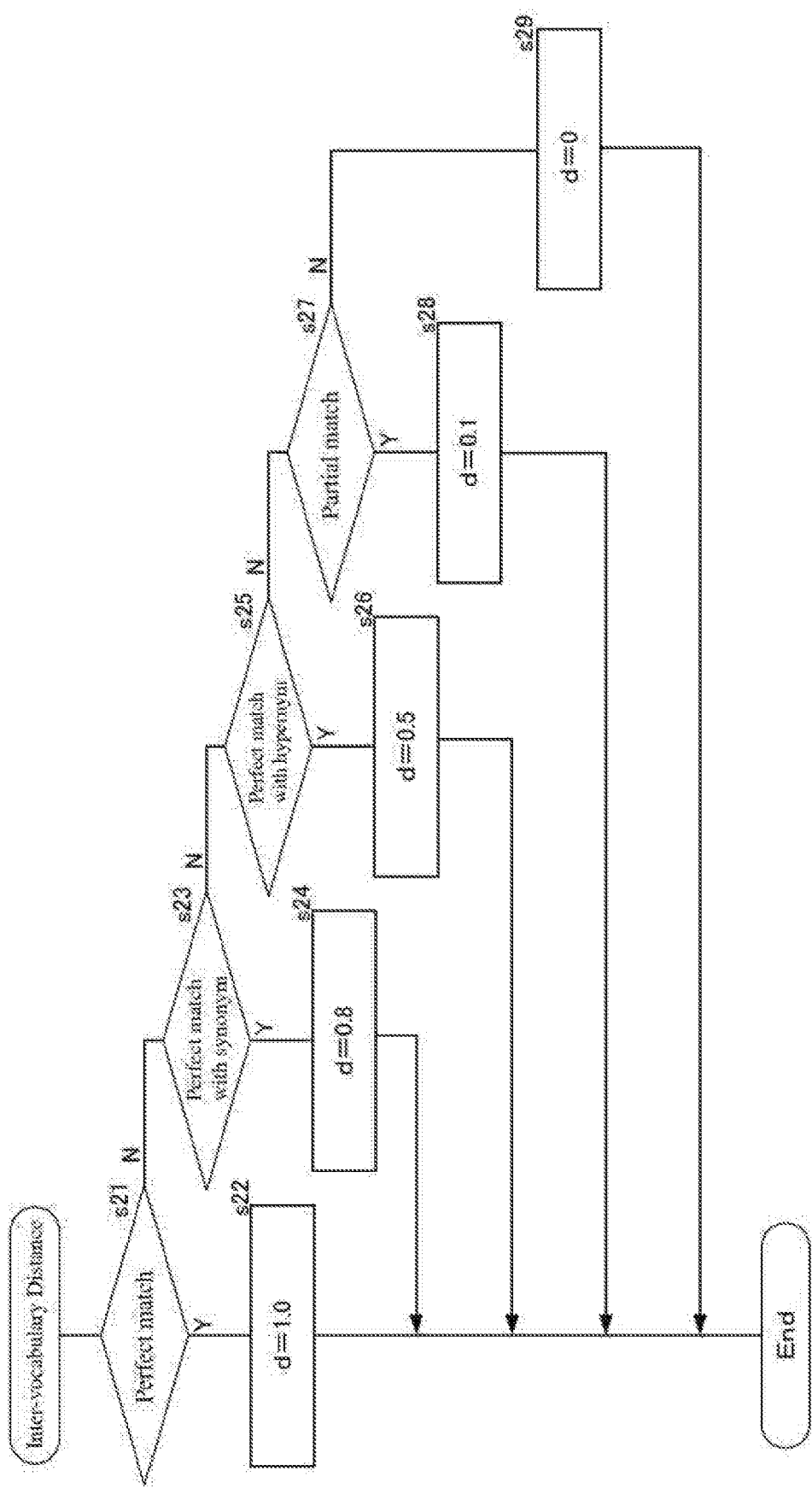
FIG. 11 is a flowchart showing processing for calculating an inter-word distance d.

FIG. 11 is a flowchart showing processing for calculating the inter-word distance d. Here, description will be given taking the case where the first weight determination part 22 executes processing for calculating the inter-word distance d as an example. The first weight determination part 22 determines whether a word described in the user data catalog 101 perfectly matches a word described in the provider data catalog 100 (s21). The first weight determination part 22 sets the inter-word distance d to 1.0 if there is a perfect match in s21 (s22).

Also, the first weight determination part 22, when it is determined in s21 that there is not a perfect match, determines whether a synonym of a word indicating an observation object of the user data catalog 101 perfectly match a word indicating an observation object of the provider data catalog 100 (s23). The determination in s23 is performed by, for example, the first weight determination part 22 referring to the dictionary DB 14. For example, the first weight determination part 22 specifies a synonym (one or plurality) of a word indicating an observation object of the user data catalog 101, by referring to the dictionary DB 14. The first weight determination part 22 then determines whether any of the synonyms of the word indicating an observation object of the user data catalog 101 perfectly matches a word indicating an observation object of the provider data catalog 100. When it is determined in s23 that there is a perfect match with one of the synonyms, the first weight determination part 22 sets the inter-word distance d to 0.8 (s24).

Also, when it is determined in s23 that there is not a perfect match with a synonym, the first weight determination part 22 determines whether a word indicating an observation object of the user data catalog 101 perfectly matches a hypernym of a word indicating an observation object of the provider data catalog 100 (s25). The determination of s25 is performed by, for example, the first weight determination part 22 referring to the dictionary DB 14. For example, the first weight determination part 22 specifies a hypernym (one or plurality) of a word indicating an observation object of the provider data catalog 100, by referring to the dictionary DB 14. The first weight determination part 22 then determines whether a word indicating an observation object of the user data catalog 101 perfectly matches any of the specified hypernyms. The determination of s25 is thereby performed. When it is determined in s25 that there is a perfect match with one of the hypernyms, the first weight determination part 22 sets the inter-word distance d to 0.5 (s26).

Also, the first weight determination part 22, when it is determined in s25 that there is not a perfect match with a hypernym, determines whether there is a partial match in which a word indicating an observation object of the user data catalog 101 partially matches a word indicating an observation object of the provider data catalog 100 (s27). The first weight determination part 22, when it is determined in s27 that there is a partial match, sets the inter-word distance d to 0.1 (s28). Also, the first weight determination part 22, when it is determined in s27 that there is not a partial match, sets the inter-word distance d to 0 (s29).

In the present embodiment, the determination of whether there is a perfect match with a synonym (s23) and the determination of whether there is a perfect match with a hypernym (s25) are performed prior to the determination (s27) of a partial match. Accordingly, in the case of corresponding to a perfect match with a synonym and corresponding to a partial match, the inter-word distance is determined based on the perfect match with the synonym. Also, in the case of corresponding to a perfect match with a hypernym and corresponding to a partial match, the inter-word distance is determined based on the perfect match with the hypernym.

Note that the processing of s21 to s29 may be executed in any order, as long as s22 is executed after s21, s24 is executed after s23, s26 is executed after s25, and s28 is executed after s27. The processing procedure and weight attachment shown in FIG. 11 are considered in all respects to be illustrative.

In s13 of FIG. 10, the processing shown in FIG. 11 is executed and the inter-word distance d is derived, for every combination of observation objects created in s11. Also, in s14, the processing shown in FIG. 11 is executed and the inter-word distance d is derived, for every combination of the observation characteristics of the observation objects created in s12.

The first weight determination part 22 determines the weight value $\alpha$ for every word indicating an observation object of the user data catalog 101, using the inter-word distance d derived for every combination of observation objects created in s11 (s15). In s15, the first weight determination part 22 determines, for every word indicating an observation object of the user data catalog 101, the sum of the inter-word distances d of the combinations of that word as the weight value $\alpha$. Also, the second weight determination part 23 determines the weight value $\beta$ for every word indicating an observation characteristic of an observation object of the user data catalog 101, using the inter-word distance d derived for every combination of observation characteristics of the observation objects created in s12 (s16). In s16, the second weight determination part 23 determines, for every word indicating an observation characteristic of an observation object of the user data catalog 101, the sum of the inter-word distances d of the combinations of that word as the weight value β.

The score calculation part 24 calculates a score, using the weight values α of the words of the observation objects determined in s15 and the weight values β of the observation characteristics determined in s16 (s17). In s17, the score calculation part 24 calculates, for every observation object, the product of the weight value α of that the observation object and the weight values β of the observation characteristics of that observation object, and calculates the sum of the products calculated here as the score.

Note that the processing of s11 to s16 shown in FIG. 10 may be executed in any order, as long as s11, s13 and s15 are executed in the stated order, and s12, s14 and s16 are executed in the stated order. For example, this processing may be executed in order of s11, s13, s15, s12, s14 and s16, may be executed in order of s12, s14, s16, s11, s13 and s15, or may executed in order of s12, s11, s14, s13, s16 and s15.

Returning to FIG. 9, the search device 10, upon completing the score calculation processing of s4, determines whether there is a provider data catalog 100 whose score has not been calculated with respect to the user data catalog 101 to be processed (unprocessed provider data catalog 100) (s5). The search device 10, upon determining in s5 that there is an unprocessed provider data catalog 100, returns to s3 and repeats the above processing.

The search device 10, upon determining in s5 that there is no unprocessed provider data catalog 100, performs ranking processing (s6). The ranking processing in s6 is processing for sorting the provider data catalogs 100 extracted in the filtering processing of s2 in descending order of score. In this example, the coincidence of the user data catalog 101 to be processed and the provider data catalog 100 is higher as the score calculated in s4 is higher.

Figure 12:
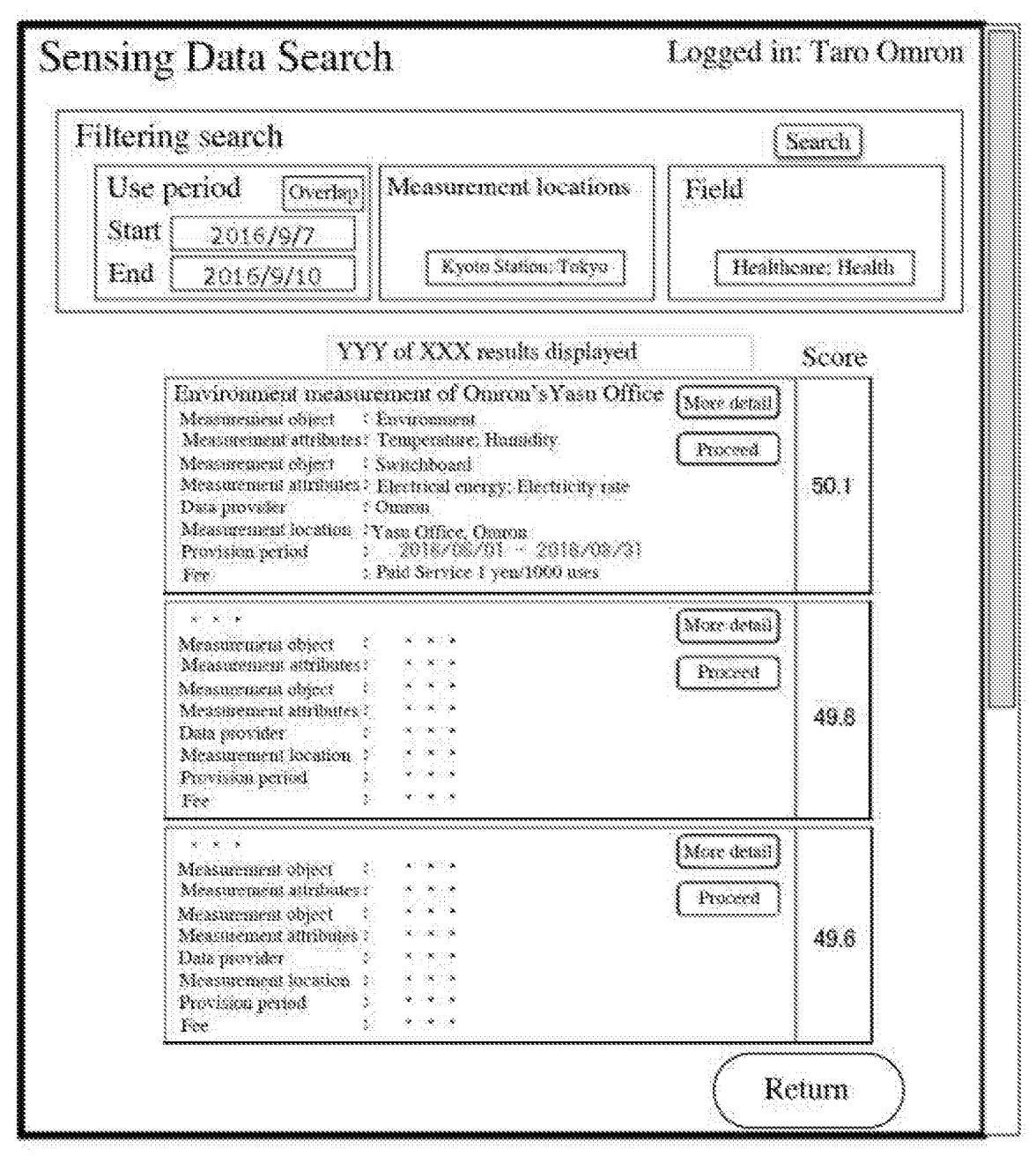

The search device 10 outputs the processing result of the ranking processing of s6 (s7), and ends this processing. In s7, the processing result of the ranking processing is output to the user-side system 3, for example. The user-side system displays the processing result of the ranking processing on a display device, for example. For example, in the user-side system 3, a display screen on which the provider data catalogs 100 are arranged in descending order of coincidence with respect to the user data catalog to be processed (from largest score to smallest score) is displayed on the display device (refer to FIG. 12). Also, a score serving as a measure indicating the coincidence with the user data catalog 101 to be processed is associated with every provider data catalog 100. Accordingly, the operator of the user-side system 3, by checking this display screen, is able to easily check which provider data catalogs 100 have a high coincidence with respect to the user data catalog to be processed, and is also able to easily check the degree of coincidence.

In this case, the search device 10 according to this example judges the coincidence of the provider data catalog 100 with the user data catalog 101, based on the degree of association of the meaning of words indicating the observation object and observation characteristics, rather than judging the coincidence of the provider data catalog 100 with the user data catalog 101 by the coincidence/non-coincidence of words indicating the observation object and observation characteristics. Accordingly, this search device 10 is able to appropriately judge the coincidence of the provider data catalog 100 and the user data catalog 101.

Note that this invention is not limited to the embodiments as described above, and the constituent elements can be embodied in various forms at the implementation stage without departing from the spirit of the invention. Also, various inventions can be formed by appropriately combining a plurality of the constituent elements disclosed in the above embodiments. For example, some of the constituent elements shown in the embodiments may be omitted. Furthermore, constituent elements may be combined across different embodiments as appropriate.

Some or all of the above embodiments can also be described as in the following supplementary remarks, but are not limited to the following.

Supplementary Remark 1

A score calculation unit including:
at least one hardware processor,
the hardware processor being configured to:
determine, based on a relationship between a vocabulary of an observation object described in a first data catalog and a vocabulary of an observation object described in a second data catalog, a weight value between the observation objects,
determine, based on a relationship between a vocabulary of an observation characteristic of the observation object described in the first data catalog and a vocabulary of an observation characteristic of the observation object described in the second data catalog, a weight value between the observation characteristics, and
calculate a score related to a coincidence of the first data catalog with the second data catalog, using the weight value between the observation objects and the weight value between the observation characteristics.

Supplementary Remark 2

A score calculation method for executing, using at least one hardware processor, processing for:
determining, based on a relationship between a vocabulary of an observation object described in a first data catalog and a vocabulary of an observation object described in a second data catalog, a weight value between the observation objects,
determining, based on a relationship between a vocabulary of an observation characteristic of the observation object described in the first data catalog and a vocabulary of an observation characteristic of the observation object described in the second data catalog, a weight value between the observation characteristics, and
calculating a score related to a coincidence of the first data catalog with the second data catalog, using the weight value between the observation objects and the weight value between the observation characteristics.

REFERENCE SIGNS LIST

1 Network server
2 Provider-side system
3 User-side system
5 Network
10 Search device
11 Control unit
12 Provider data catalog storage database (provider data catalog storage DB)
13 User data catalog storage database (user data catalog storage DB)
14 Dictionary database
15 Communication part
21 Filtering processing part
22 First weight determination part 23 Second weight determination part
24 Score calculation part
100 Provider data catalog (provider DC)
101 User data catalog (user DC)

The invention claimed is:

1. A score calculation unit configured to calculate a score relating to a degree of matching between a first data catalog and a second data catalog, the first and second data catalogs each including a first word indicating an observation object and a second word indicating an observation characteristic, the observation object being an abstraction of a real world phenomenon, the observation characteristic being a characteristic of the observation object and is observed with a sensor, the score calculation unit comprising a processor configured with a program to perform operations comprising:
   operation as a first weight determination part configured to determine, based on a relationship between the first word included in the first data catalog and the first word included in the second data catalog, a first weight value relating to the observation object;
   operation as a second weight determination part configured to determine, based on a relationship between the second word included in the first data catalog and the second word included in the second data catalog, a second weight value relating to the observation characteristic; and
   operation as a score calculation part configured to calculate, by multiplying the first weight value by the second weight value, a score relating to the degree of matching between the first data catalog and the second data catalog.

2. The score calculation unit according to claim 1, wherein the processor is configured with the program such that operation as the first weight determination part comprises determining the first weight value, based on a degree of association of a meaning of the first word included in the first data catalog and the first word included in the second data catalog.

3. The score calculation unit according to claim 2, wherein the processor is configured with the program such that operation as the second weight determination part comprises determining the second weight value, based on a degree of association of a meaning of the second word included in the first data catalog and the second word included in the second data catalog.

4. The score calculation unit according to claim 2, wherein the first data catalog is a sensor-side data catalog relating to a sensor that senses the observation characteristic of the observation object, and
the second data catalog is an application-side data catalog relating to an application that uses sensing data sensed by the sensor.

5. The score calculation unit according to claim 1, wherein the processor is configured with the program such that operation as the second weight determination part comprises determining the second weight value, based on a degree of association of a meaning of the second word included in the first data catalog and the second word included in the second data catalog.

6. The score calculation unit according to claim 5, wherein the first data catalog is a sensor-side data catalog relating to a sensor that senses the observation characteristic of the observation object, and
the second data catalog is an application-side data catalog relating to an application that uses sensing data sensed by the sensor.

7. The score calculation unit according to claim 1, wherein the first data catalog is a sensor-side data catalog relating to a sensor that senses the observation characteristic of the observation object, and
the second data catalog is an application-side data catalog relating to an application that uses sensing data sensed by the sensor.

8. A search device comprising a processor configured with a program to perform operations comprising:
   operation as a first data catalog storage part configured to store first data catalogs, and
   operation as a score calculation unit configured to calculate a score relating to a degree of matching between a second data catalog and each of one or more first data catalogs included in the first data catalogs stored in the first data catalog storage part, the first and second data catalogs each including a first word indicating an observation object and a second word indicating an observation characteristic, the observation object being an abstraction of a real world phenomenon, the observation characteristic being a characteristic of the observation object and is observed with a sensor,
   wherein the processor is configured with the program such that operation as the score calculation unit comprises:
   operation as a first weight determination part configured to determine, based on a relationship between the first word included in the each of one or more first data catalogs and the first word included in the second data catalog, a first weight value relating to the observation object;
   operation as a second weight determination part configured to determine, based on a relationship between the second word included in the each of one or more first data catalogs and the second word included in the second data catalog, a second weight value relating to the observation characteristic; and
   operation as a score calculation part configured to calculate, by multiplying the first weight value by the second weight value, a score relating to the degree of matching between the each of one or more first data catalogs and the second data catalog.

9. The search device according to claim 8, wherein the processor is configured with the program such that operation as the score calculation unit further comprises operation as a filtering processing part configured to extract one or more first data catalogs from the first data catalogs stored in the first data catalog storage part; and
wherein the processor is configured with the program such that operation as the score calculation part comprises calculating, by multiplying the first weight value by the second weight value, a score relating to the degree of matching between each of the extracted one or more first data catalogs and the second data catalog.

10. The search device according to claim 8, wherein the processor is configured with the program to perform operations further comprising:
   operation as an output part configured to output the score relating to the degree of matching between the each of one or more first data catalogs and the second data catalog, calculated by the score calculation unit.

11. The search device according to claim 8, wherein the processor is configured with the program such that operation as the first weight determination part comprises determining the first weight value, based on a degree of association of a meaning of the first word included in the first data catalog and the first word included in the second data catalog.

12. The search device according to claim 8,
wherein the processor is configured with the program such that operation as the second weight determination part comprises determining the second weight value, based on a degree of association of a meaning of the second word included in the first data catalog and the second word included in the second data catalog.

13. The search device according to claim 8, comprising:
wherein the first data catalog is a sensor-side data catalog relating to a sensor that senses the observation characteristic of the observation object, and
the second data catalog is an application-side data catalog relating to an application that uses sensing data sensed by the sensor.

14. A score calculation method that is executed by a computer in order to calculate a score relating to a degree of matching between a first data catalog and a second data catalog, the first and second data catalogs each including a first word indicating an observation object and a second word indicating an observation characteristic, the observation object being an abstraction of a real world phenomenon, the observation characteristic being a characteristic of the observation object and is observed with a sensor, the score calculation method comprising:
   determining, based on a relationship between the first word included in the first data catalog and the first word included in the second data catalog, a first weight value relating to the observation object;
   determining, based on a relationship between the second word included in the first data catalog and the second word included in the second data catalog, a second weight value relating to the observation characteristic; and
   calculating, by multiplying the first weight value by the second weight value, a score relating to the degree of matching between the first data catalog and the second data catalog.

15. A non-transitory computer-readable storage medium storing a score calculation program that causes a computer to execute processing for calculating a score relating to a degree of matching between a first data catalog and a second data catalog, the first and second data catalogs each including a first word indicating an observation object and a second word indicating an observation characteristic, the observation object being an abstraction of a real world phenomenon, the observation characteristic being a characteristic of the observation object and is observed with a sensor, the score calculation program being configured to cause the computer to execute operations comprising:
   determining, based on a relationship between the first word included in the first data catalog and the first word included in the second data catalog, a first weight value relating to the observation object;
   determining, based on a relationship between the second word included in the first data catalog and the second word included in the second data catalog, a second weight value relating to the observation characteristic; and
   calculating, by multiplying the first weight value by the second weight value, a score relating to the degree of matching between the first data catalog and the second data catalog.

\* \* \* \* \*